Figure 1:
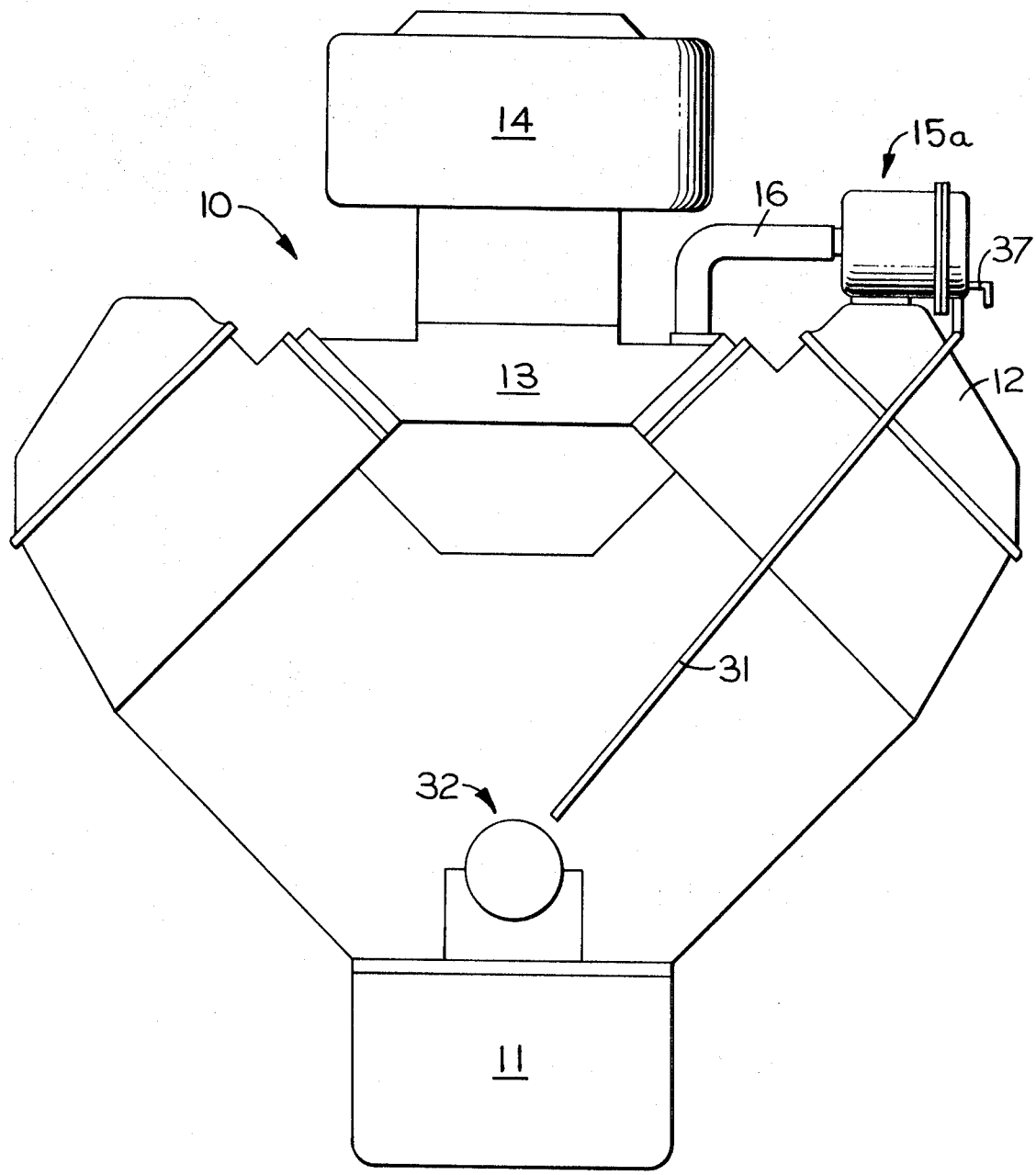

United States Patent

[11] 3,620,197

| [72] | Inventors | Thomas M. Albright<br>Chillicothe;<br>James S. Barton, Morton, both of Ill. |
|---|---|---|
| [21] | Appl. No. | 4,337 |
| [22] | Filed | Jan. 20, 1970 |
| [45] | Patented | Nov. 16, 1971 |
| [73] | Assignee | Caterpillar Tractor Co.<br>Peoria, Ill. |

[54] CRANKCASE VENTILATING MEANS FOR SUBMERGED ENGINE OPERATION
5 Claims, 2 Drawing Figs.

[52] U.S. Cl. .................................................. 123/119 B,
123/41.86
[51] Int. Cl. .................................................. F02f 9/06,
F02m 25/00
[50] Field of Search ............................................. 123/119,
119 B, 41.86

[56] References Cited
UNITED STATES PATENTS
2,775,960  1/1957  Druzynski .................... 123/119 B
3,056,420  10/1962  Dietrich ........................ 123/119 B
3,312,207  4/1967  Martin et al. .................. 123/119 B

*Primary Examiner*—Al Lawrence Smith
*Attorney*—Fryer, Tjensvold, Feix, Phillips & Lempio ABSTRACT: A crankcase ventilating means comprises a spring-biased valve means adapted to open to vent gases from the crankcase of an internal combustion engine to the intake manifold thereof when the pressure of such gases exceeds a predetermined level. The opening and closing of the valve means is automatically controlled by pressure level variations occurring in a control chamber normally communicating with ambient air pressure, via a pressure sensing conduit, during "on land" operations. An open end of the conduit is positioned adjacent to a crankshaft sealing area to sense the increasing pressure level occasioned thereat due to progressive submersion of the engine in water. Thus, the pressure level in the crankcase, required to open the valve means, will automatically increase in direct proportion to the increased depth of engine submersion.

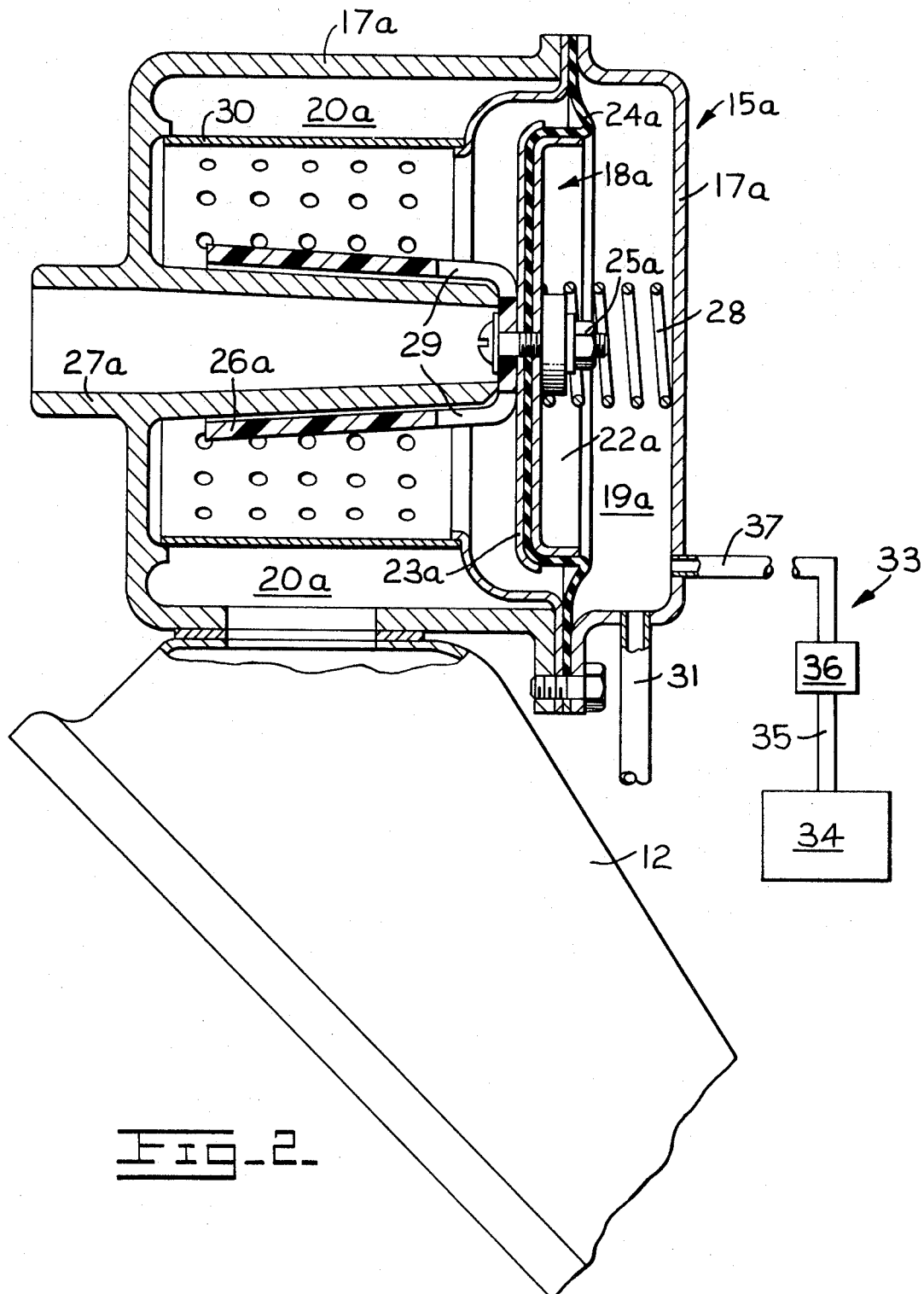
Fig_2_

CRANKCASE VENTILATING MEANS FOR SUBMERGED ENGINE OPERATION

Certain internal combustion type engines are adapted for land operations as well as for intermittent or continuous underwater operations. A number of such engines utilize a so-called positive crankcase ventilation valve (PCV) which functions to vent unduly high crankcase pressures and unburned gases to the engine's intake manifold for combustion purposes. During submerged engine operation, it is desirable to maintain a suitably high crankcase pressure to prevent water and like contaminants from entering into the crankcase via critical sealing areas, such as the crankshaft sealing area. Conventional PCV valves do not exhibit the ability to sense the pressure differential occurring between the crankcase pressure and such critical sealing areas to positively assure sufficiently high crankcase pressures during all phases of submerged engine operation to prevent entrance of water into the engine.

An object of this invention is to overcome the above, briefly described problems by providing an economical and noncomplex ventilating means for efficiently venting gases from the crankcase of an internal combustion engine to the intake manifold thereof and for maintaining such pressure level sufficiently high during all phases of submerged engine operation to prevent water and like contaminants from entering therein.

The ventilating means of this invention comprises valve means operatively associated with a control chamber means adapted to contain a variable pressure level therein for urging the valve means to a closed position against the counteracting opening pressure of the crankcase gases. A pressure sensing means senses varied pressure levels occurring at a critical sealing area of the engine, located vertically downwardly and remote from the valve means, and communicates same to the control chamber means. The pressure level in the crankcase, required to open the valve means, will automatically increase in direct proportion to increases in the depth of submersion of the engine.

Other objects of this invention will become apparent from the following description and accompanying drawings wherein:

FIG. 1 is a front elevational view of an internal combustion engine employing the ventilating means of this invention therewith; and FIG. 2 is an enlarged, cross-sectional view of such ventilating means.

Referring to FIG. 1, an internal combustion engine 10 comprises a crankcase 11 arranged in a conventional manner to have the chamber thereof communicate with a chamber substantially defined by a rocker arm cover 12. An intake manifold 13 is suitably mounted on the engine to receive ambient air via a filter 14 for combustion purposes. During operation, the engine's pistons (not shown) function in a conventional manner to permit a limited amount of "blow-by" gases to pass thereby. Such gases tend to collect in the intercommunicating chambers formed by the crankcase and rocker arm cover.

A ventilating means 15a, shown and fully described in U.S. Pat. No. 3,469,565, assigned to the assignee of this application, is arranged to automatically communicate such "blow-by" gases from the crankcase to the intake manifold via a conduit 16. Such ventilating means is preferably placed high on the engine and comprises a two-part housing 17a having a circular diaphragm assembly 18a secured therein to define a first chamber or chamber control means 19a and a second chamber 20a communicating with the crankcase.

The diaphragm assembly, separating chamber 19a from the gases in the crankcase, comprises cup-shaped members 22a and 23a having centrally disposed portions of a flexible diaphragm 24a clamped therebetween by a threaded nut and bolt 25a. A normally compressed valve means 26a comprises a tapered plastic sleeve slidably mounted on a tubular portion 27a of the housing. The cup end of the tubular sleeve is attached to the diaphragm assembly by the nut and bolt.

A compressed coil spring 28 may be disposed in the manner illustrated to urge the valve means to its normally closed position. However, in certain applications such spring means may be omitted and the valve means held in such normally closed position by the closing force occasioned by the pressure differential existing between the pressures prevalent in chambers 19a and 20a. Sleeve 26a has a plurality of slotted apertures 29 formed therethrough to progressively increase the communication between chamber 20a and the intake manifold when the valve means is extended or opened.

A perforated cylinder 30 may be disposed in chamber 20a to substantially surround the valve means. The cylinder primarily functions as an oil separator to prevent appreciable amounts of oil from being discharged into the intake manifold along with the crankcase fumes or gases. It can be seen that valve means 26a will extend relative to tubular portion 27a when the pressure level in chamber 20a exceeds the additive counteracting forces generated by the pressure level in chamber 19a and spring 28.

The above-described ventilating means is identical to the one disclosed in U.S. Pat. No. 3,469,565 and corresponding components and constructions are depicted by identical numerals.

The ventilating means of this invention essentially comprises the addition of a pressure sensing means, shown in the form of a conduit 31, communicating with control chamber means 19a and terminating at its open end adjacent to a front crankshaft sealing area 32. Upon submersion of the engine in water, such sealing area constitutes a critical pressure point on the engine which is susceptible to leakage of water and other contaminants therepast when the ambient water pressure level thereat becomes unduly higher than the counteracting crankcase pressure level. Although the crankshaft seal is a prime example of a critical sealing area, it should be understood that the open end of conduit 31 could be positioned adjacent other critical pressure points on the engine.

The pressure sensing means functions to sense varied pressure levels adjacent to sealing area 32, located vertically downwardly and remote from the valve means, in response to submersion of the engine to varied depths under water. Such varied pressure level is communicated directly to control chamber means 19a to automatically vary the pressure level therein in an advantageous manner. In particular, upon at least partial submersion of the engine to a point whereat the open end of conduit 31 is blocked, a pressure rise will be occasioned in the conduit in direct proportion to the depth of such submersion.

Upon a like increase of the pressure level in chamber 19a, a proportionate rise in crankcase pressure will be required to move diaphragm assembly 18a rightwardly in FIG. 2 to open the valve means to communicate the crankcase with the intake manifold. For example, when the open end of conduit 31 is submerged to a depth of one foot of water, the pressure level occasioned in the conduit will approximate 0.4335 p.s.i. to increase the pressure level in to place the open end 19a by a like amount. Should the engine become further submerged increased of the conduit two feet under water, the pressure level in chamber 19a will be increased by 0.8670 p.s.i., thus requiring a further increase in crankcase pressure to open the valve means.

In certain applications, such as when the engine is submerged for only a short time interval, pressure sensing means 31 per se will prove adequate to assure efficient engine operation and ventilation. However, when the engine is submerged over an extended period of time and at pronounced depths, water or other contaminants will more readily tend to enter chamber 19a via conduit 31 to subject diaphragm assembly to possible damage. In particular, the pumping action of the diaphragm assembly will tend to displace the air trapped in chamber 19a with water.

Therefore, an air pressure means 33 is preferably employed in the ventilating means to continuously communicate air pressure, preferably maintained at a substantially constant level such as 6 p.s.i., to chamber 19a. Such air pressure means may comprise an engine driven air compressor 34 arranged to discharge pressurized air into a conduit 35 and through a pressure regulator 36. The pressure regulator in turn communicates a constant air pressure to chamber 19a via a conduit 37. Therefore, air trapped in chamber 19a will tend to flow out of conduit 31 until the engine is submerged to a depth whereat the ambient water pressure adjacent to sealing area 32 is at least equal to the pressure level occasioned in conduit 31. At 6 p.s.i. such depth will approximate 13.842 feet of water.

When the engine is operating on land, the ventilating means will function substantially in the same manner as the ventilating means disclosed in U.S. Pat. No. 3,469,565. In particular, the combined forces of ambient air pressure occasioned in chamber 19a and spring 28 will counteract the opposing force of the crankcase pressure to provide the predetermined pressure differential for venting purposes.

We claim:

1. In a submersible internal combustion engine comprising an intake manifold, a crankcase and ventilating means for automatically venting gases from said crankcase to said intake manifold when the pressure of said gases exceeds a predetermined level, said ventilating means comprising valve means, control chamber means for containing a variable pressure level therein for urging said valve means to a closed position against the counteracting opening pressure of said gases, and pressure sensing means connected to said control chamber means for sensing varied pressure levels occasioned at a critical pressure point, located adjacent to said engine and further located vertically downwardly and remote from said valve means, in response to submersion of said engine to varied depths underwater and for communicating said varied pressure levels to said control chamber means, and air pressurizing means for communicating a substantially constant, predetermined, above atmospheric air pressure to said control chamber means and to said pressure sensing means during submersion to a predetermined depth.

2. The invention of claim 1 wherein said pressure sensing means comprises a conduit terminating at an open end thereof adjacent to said critical pressure point.

3. The invention of claim 1 wherein said critical pressure point is located at a crankshaft sealing area of said engine.

4. The invention of claim 1 wherein said ventilating means comprises a flexible diaphragm assembly continuously separating said control chamber means from the gases in said crankcase, said valve means operatively connected to said diaphragm assembly.

5. The invention of claim 4 further comprising spring means disposed in said control chamber means and attached to said diaphragm assembly for urging said valve means to a normally closed position whereby the gas pressure in said crankcase is counteracted by the force of said spring and the pressure level in said control chamber means.

* * * * *